United States Patent [19]

Eriksen

[11] 4,336,247

[45] Jun. 22, 1982

[54] BODY SYSTEM NUTRIENT MATERIAL

[76] Inventor: Arthur E. Eriksen, P.O. Box 965, Wylie, Tex. 75098

[21] Appl. No.: 168,741

[22] Filed: Jul. 14, 1980

Related U.S. Application Data

[63] Continuation of Ser. No. 939,369, Sep. 5, 1978, abandoned.

[51] Int. Cl.³ .................. A61K 31/365; A61K 35/12; A61K 35/56
[52] U.S. Cl. ..................................... 424/95; 424/280; 426/72; 426/385; 426/544
[58] Field of Search ............... 424/95, 280; 426/72, 426/385, 544

[56] References Cited

U.S. PATENT DOCUMENTS

| | | | |
|---|---|---|---|
| 3,335,014 | 8/1967 | Balestra | 426/643 |
| 3,408,210 | 10/1968 | Heyman | 426/643 |
| 3,529,975 | 9/1970 | Gray | 426/643 |
| 3,712,821 | 1/1973 | Ronsivelli et al. | 426/643 |
| 3,894,157 | 7/1975 | Gottleib et al. | 426/268 |
| 4,126,705 | 11/1978 | Hait | 426/643 |

*Primary Examiner*—Leonard Schenkman
*Attorney, Agent, or Firm*—Warren H. Kintzinger

[57] ABSTRACT

A whole body system nutrient material basically of lyophilized and dried mussel meats and body fluids with ascorbic acid (vitamin "C") added. The nutrient material is produced with a coating of ascorbic acid applied to substantially all surfaces of previously dried mussel material cells through immersion of the dried material in fluid containing ascorbic acid in solution in quantity such as to coat mussel material cells inside and out. One solution useful is a water based solution and another is an alcohol solution, both with ascorbic acid that remains as a coating on surfaces. The mussel particulate material, even though it is fine, consists of porous cell clusters having the nucleic components incorporated as part of the inner cell walls. The intercellular matrix ground substances generally are also permeable. The mussel material cell clusters may be likened to a sponge and upon removal of the volatile alcohol, it would still be a sponge, except that while still sponge-like, all surfaces are coated with ascorbic acid. Thus, means is provided for preserving the integrity of the highly unsaturated fatty acids (18–20 carbon length molecules with 5 and 6 unsaturated double bonds) that are compounds forming precursor nutrients for the metabolic production of various hormones.

2 Claims, No Drawings

BODY SYSTEM NUTRIENT MATERIAL

This is a continuation of application Ser. No. 939,369, filed Sept. 5, 1978, now abandoned.

This invention relates in general to health foods and body system nutrients, and more particularly, to a lyophilized and dried mussel meat and body fluid material with ascorbic acid added. The ascorbic acid is coated from solution on substantially all surfaces of previously dried mussel material as the ascorbic acid carrying fluid is volatilized and dehydrated.

The human body is an assemblage of many various types of cells, with all cells of any type produced substantially the same way from essentially the same materials. Simple single celled animolecoles are essentially the same cell to cell as the aggregation of different type cells found in various complex systems that together comprise the human body. Obviously, all cells require nourishment to survive with all cells and cell tissue generally functioning to keep the body alive. Even so, some 95 percent of all cells have a finite lifetime with these cells in the human body in a constant state of degeneration and replenishment. Science has determined that, of a couple hundred thousand chemicals that could have been available for utilization in the human body, only some forty chemicals are presently known to be required to maintain the body in a normal state of health with a few more yet to be identified. The group of chemicals used are in many different combinations, and some are subject to conversion into other combinations in a continuing varying action in response to body needs. There are over 100 different compound combinations, in the circulating blood stream, comprised principally of protein and sugar derivitives with their composition in a constant state of change in order to meet the demands at any particular time and from time to time. Added to these variant compositions is the existence of several hundred thousand systems that enable the body's chemical reactions to occur and with the number and types of enzymes in a continuous state of change. Further, a dynamic condition exists in utilization of the body's endocrine systems for the many hormonal activities necessary in maintaining normal good health. Obviously, the biochemist's job just of identification alone is prodigious task, let alone trying to ascertan specific functions of compounds, enzyme systems, and endocrine systems for each, at any given time.

There has been considerable research particularly directed to finding solutions to specific aspects of malfunctioning body systems, and at the same time relatively little research effort directed to the fundamental activities that enable the various body systems to function properly. Since the human body is composed of an aggregate of various type cell systems any factors common to all cell systems regardless of type could be important with the roles these factors play in properly functioning cell systems. Investigation has revealed that a particular enzyme is not only present in every cell, also present in the cell wall, and also present in the cellular fluids within the cell in the form of enzyme lactic acid dehydrogenase, or LDH for short. This enzyme is constructed in five different forms in every cell type except that of the sperm cell which possesses a sixth form. These six enzyme forms are called isoenzymes identified as LDHI-1, LDHI-2, LDHI-3, LDHI-4, LDHI-5 and LDHI-X. Two of the six are particularly significant, LDHI-1 and LDHI-5, and that all the rest are composed of varying (specific related) amounts thereof. Further research has revealed that different specific types of cell tissue possessed specific distribution of isoenzyme complement components, for example, heart tissue had one distribution, lung tissue another, kidney another, liver another, etc.

A truism is, to some extent, that you are what you eat and and that therefore it would be reasonable, in view of the foregoing, to include what could be considered mature body system nutrients derived from in essence complete animals, as part of any dietary regimen, so that at least some of all these nutrient factors become available to the body's nutrient reserve pool, regularly. All vertebrate animals use substantially the same functions. It is of interest that in the case of invertebrate animals, differences do exist, such as in some of the sea squirts that utilize vanadium in their blood corpuscles, whereas humans use iron to produce hemoglobin, and filter feeding bi-valves do not have as well developed vital organs such as livers, kidneys, etc. as do humans. However, for the most part, enzymatically speaking, they posses through being in a mineral rich and food rich environment, and by reason of their exceptional ability to extract all essential minerals from their sea water environment, against exceptionally high concentration gradients, an excellent source, properly processed, of enzyme precursors available to humans. These invertebrates, such as the bi-valve commonly known as the mussel, carry out corresponding functions such as the ability to digest and assimilate, respirate, circulate, incorporate, procreate, eliminate, etc., in their way, as do humans.

Use of the meats and body fluids of mussels, dehydrated by a lyophilization process, yields a product form with substantially all cellular material maintained in its natural condition, except for removal of water and with this processing done entirely at low temperature such as to minimize denaturing of temperature sensitive volatile biochemical compounds. The product is further enhanced by the addition of ascorbic acid and particularly so with application of ascorbic acid from an aqueous or alcohol fluid containing ascorbic acid as a coating on all surfaces of the pre-lyophilization processed mussel material. It is therefore a principal object of this invention to provide an improved, more nutritionally complete body system nutrient material than generally available heretofor.

Another object is to provide such a nutrient material having optimized protection from oxidation.

A further object is to provide a vitamin C enhanced nutrient material.

Still another object is to deodorize the nutrient material by blocked minimizing of aromatic volatility.

Another object is to provide a nutrient material product suited for optimized fast assimilation into the body system particularly with non-mealtime ingestion.

Features of the invention useful in accomplishing the above objects include, in a body system nutrient material, dried mussel meats and dehydrated body fluid material with ascorbic acid added. The mussel meats and body fluids are lyophilized (freeze dried) and then ground to a fine particulate state that, even though fine consists of porous cell clusters with the nucleic components incorporated as part of the cell walls particularly the inner cell walls. The intercellular matrix ground mussel material is generally permeable with particulate cell clusters likened to a sponge. Ascorbic acid (vitamins C) is added to ground mussel material and yields with the mussel ingredients a beneficial synergistic effect as the nutrient material is utilized in the body. In a product process treatment ascorbic acid dissolved in a fluid is used to saturate the dried mussel material which is then subjected to removal of the fluid and leaves an integral ascorbic acid coating on substantially all surfaces of the mussel material. One process approach utilizes water as the fluid and another uses alcohol that is recovered for reuse. Thereafter additional granular ascorbic acid is added in specific instances to bring the ascorbic acid up to specific product desired value levels.

The preferred embodiment, useful in accomplishing the objects of the invention, comprises a mixture of dried and powdered material with ascorbic acid with this accomplished in such a manner as to provide substantially complete coating of the dried and powdered mussel material particulate surfaces. After ascorbic acid coating is accomplished with volatilization and removal of the carrier fluid completed, additional ascorbic acid is added to bring the vitamin C content up to as much as fifty percent content level by weight.

The basic body system nutrient material product is processed by taking the complete body cell systems and vital fluids contained in or produced by both sexes of selected marine species of bi-valves (generally mature mussels) commonly known as mussels. Water is removed from the meats and juices by the process of lyophilization such as feeze drying as used in the dehydration of antibiotics. The dried, non-denatured mussel material is then ground to a fine powder and thoroughly mix blended in order that the total complement of more than forty nutrients required to maintain all human body cell systems in normal good health, becomes simultaneously available to a person's body system, upon ingestion and assimilation, in a complete nutritional unit package, tablet or capsule, etc., to compensate for the possible lack of any of them in the individual's body nutrient pool.

The nutrient material product is further processed by adding ascorbic acid (vitamin C), in the range of from 5 to 50 percent by weight, as a coating on substantially all of the mussel material powder surfaces. This is accomplished through the use of ascorbic acid dissolved in a fluid (either water or an alcohol such as ethyl alcohol) being used to saturate the dried mussel material that is then subject to a vacuum volatilization or other dehydration step to remove the fluid. Additional granular ascorbic acid is then added to bring vitamin C content up to desired specific product level. The time of fluid saturation of the previously dried mussel is generally kept to minimal time period to minimize any reaction in the material. The resulting ascorbic acid coating of mussel material particle surfaces and cell walls advantageously optimizes protection from oxidation while optimizing vitamin C addition with metabolic synergistic biological activity of the nutritional compound. The ascorbic acid coating also aids in beneficially deodorizing the resulting product through an encapsulation enclosing effect of highly aromatic, volatile components.

Whereas the invention is herein described with respect to preferred embodiments, it should be realized that various changes may be made without departing from the essential contribution to the art made by the techniques hereof.

I claim:

1. A body system nutrient material comprised of freeze dried mussel material in particulate powder form wherein substantially all cell surface of said mussel material are coated with ascorbic acid, said material being prepared by freeze drying mussel meats and body fluids, grinding said freeze dried mussel meats and body fluids to a fine particulate state, adding an aqueous or alcoholic solution of ascorbic acid in an amount to saturate said freeze dried mussel material and subjecting said saturated mussel material to a dehydration step to remove the fluid, said ascorbic acid being present in the range of from 5 to 50% by weight of the nutrient material.

2. The nutrient material of claim 1 wherein additional ascorbic acid in granular form is added following the dehydration step to bring the ascorbic acid content to the desired level.

* * * * *